United States Patent Office 3,074,457
Patented Jan. 22, 1963

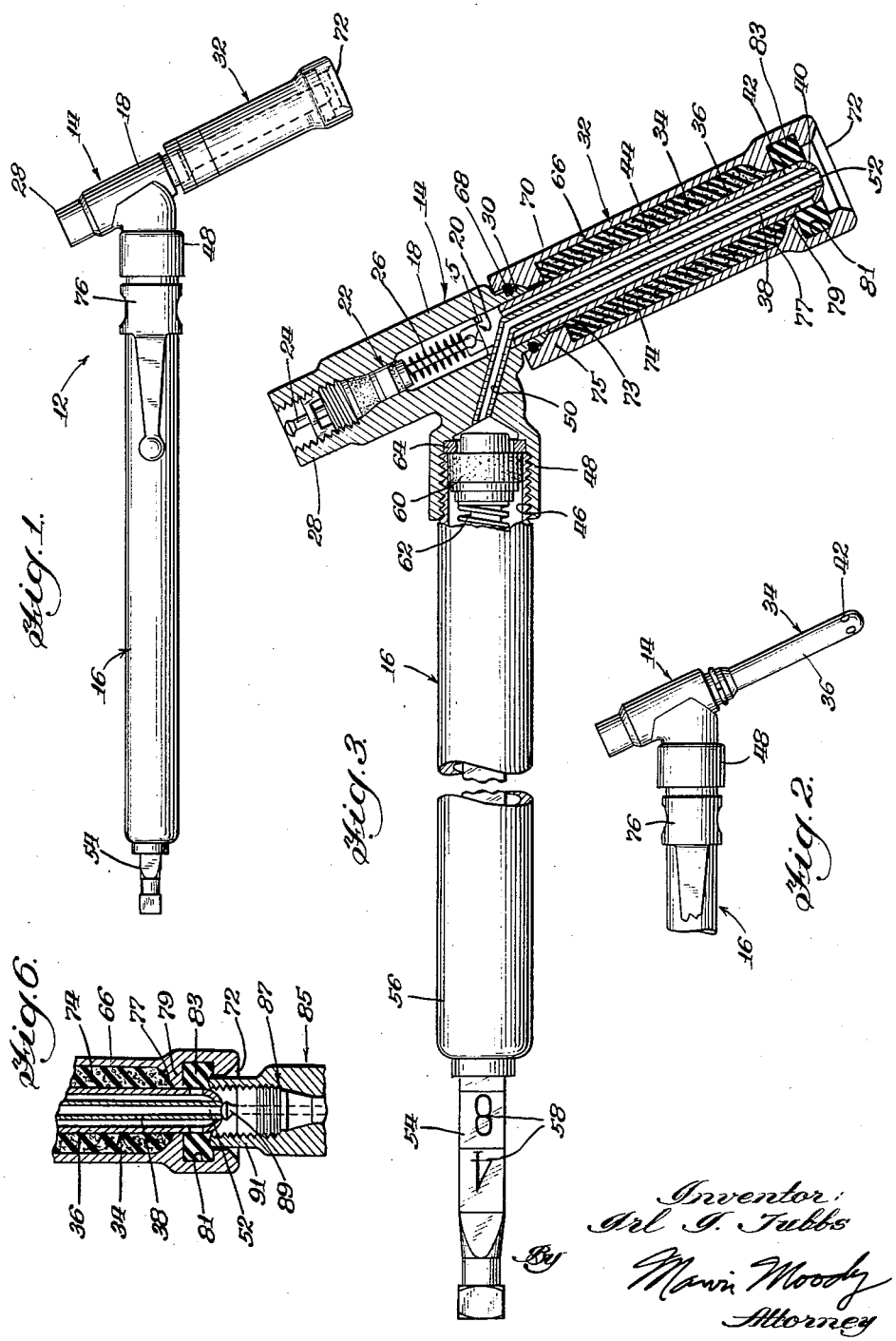

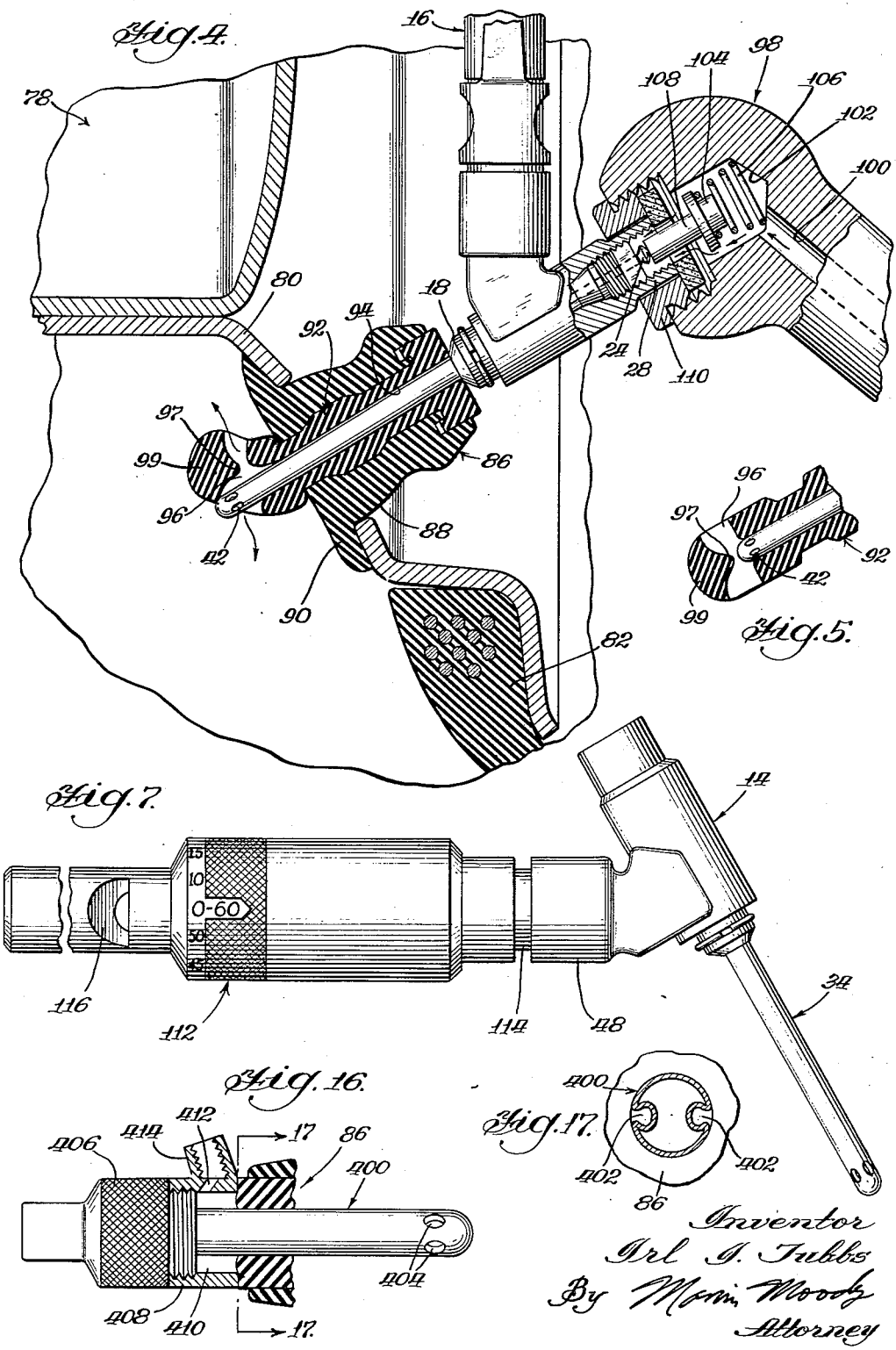

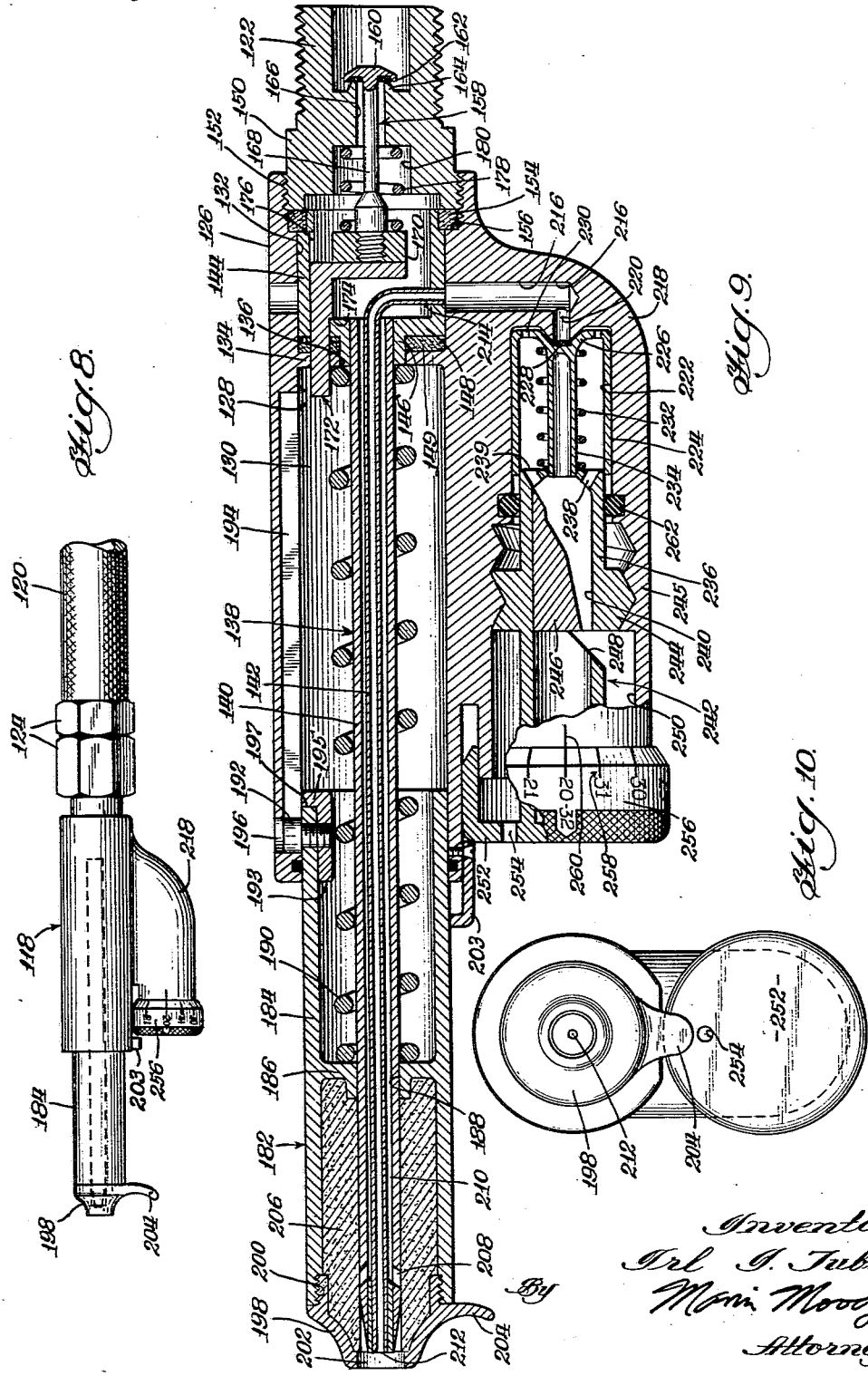

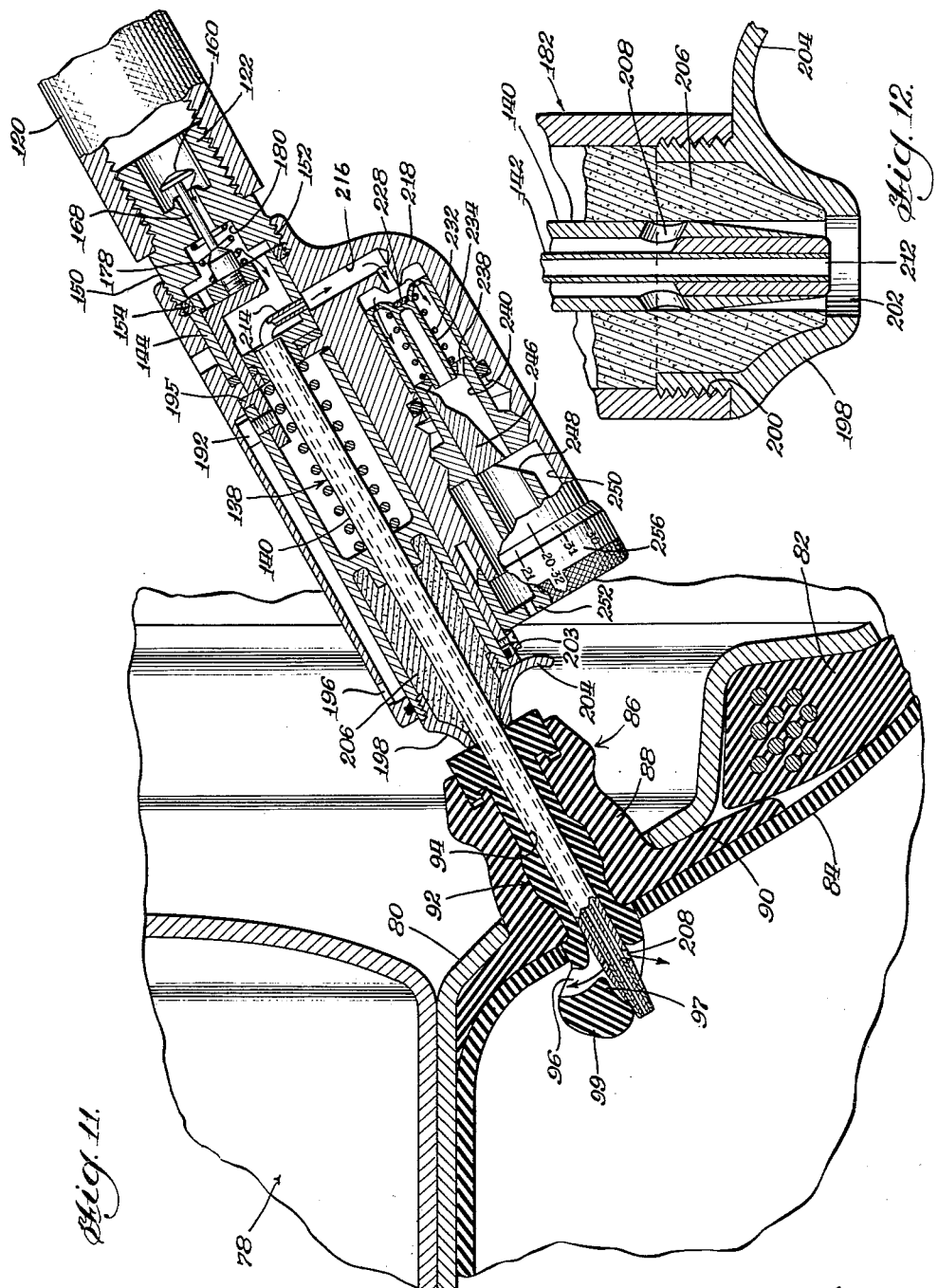

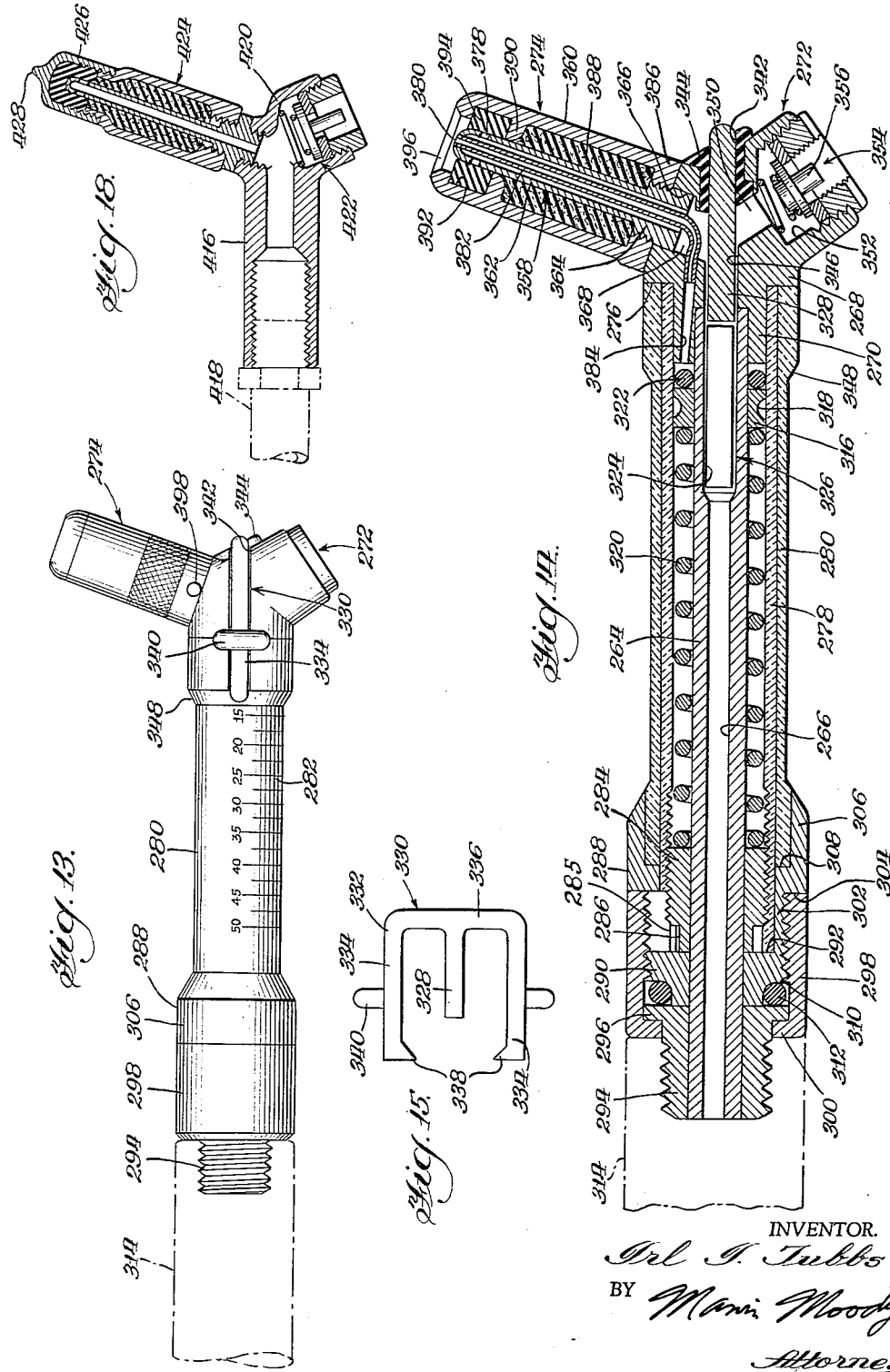

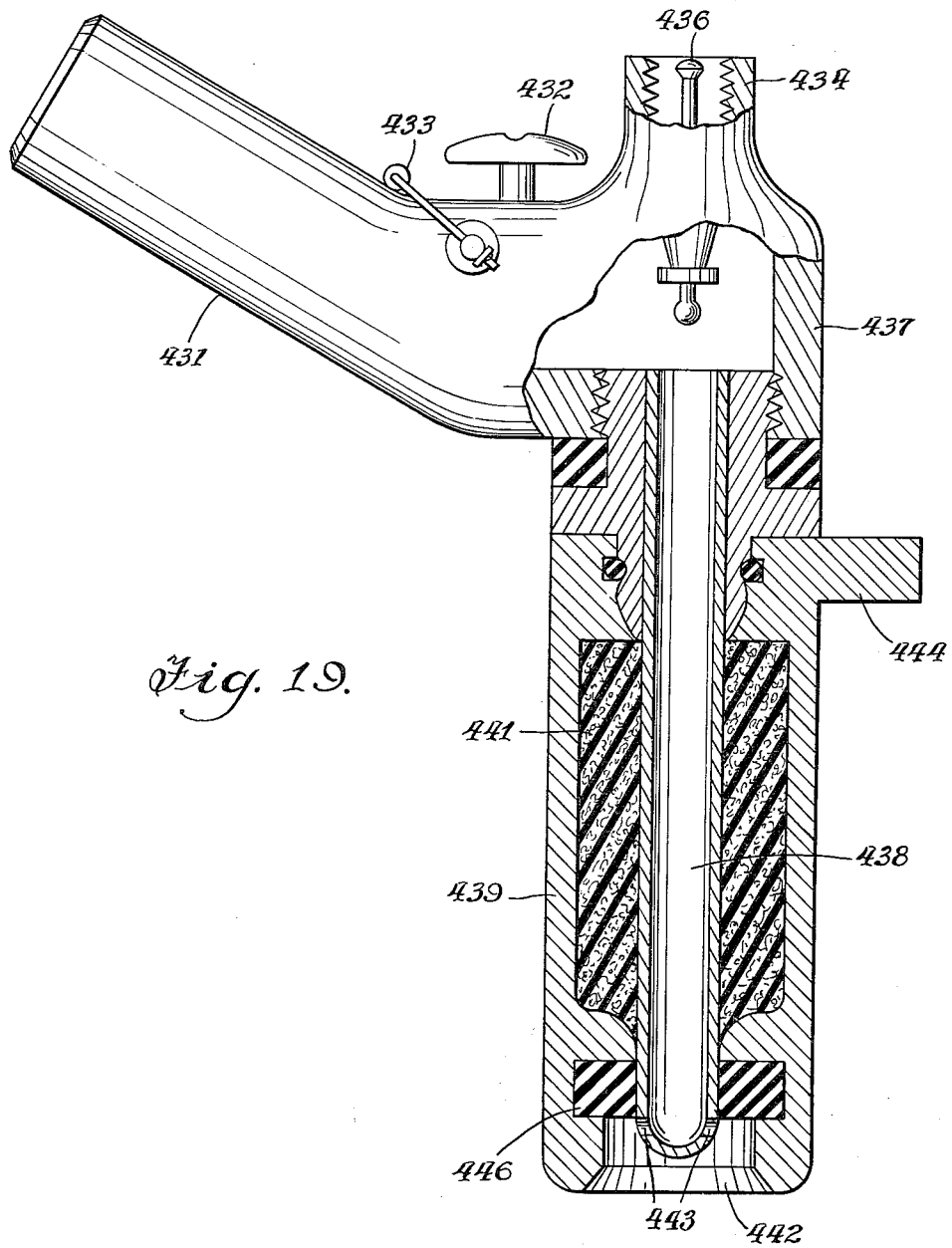

3,074,457
INFLATING DEVICE
Iri I. Tubbs, Mount Vernon, Iowa
Filed Sept. 16, 1957, Ser. No. 684,269
9 Claims. (Cl. 152—427)

This invention relates to a service tool for inflatable articles and has more particular reference to an inflator and pressure gauging tool for such articles.

An object of the invention is the provision of a novel and an improved inflator tool for valved vehicle tires or other inflatable articles.

Another object of the invention is the provision of such a tool so constructed as to enable the continuous gauging of the pressure and variations thereof within the inflatable article while fluid is being supplied thereto.

A further object of the invention is the provision of an inflator tool adapted to cooperate with the valve of a vehicle tire continuously to gauge the air pressure therein at all times during the inflating operation.

One type of valve employed in such inflatable articles is often referred to as a rubber valve. It includes a body of rubber or rubber-like material having a valve passage or port therethrough and mounted in a wall of the inflatable article with the valve passage yieldably closed. That rubber body is so mounted that one end of a tubular or hollow needle-like member is insertable from the exterior of the inflatable article through the valve passage into the fluid chamber within the inflatable article, the rubber of the body about the valve passage yielding to receive the tubular member. In that manner communication through the tubular member is established between the inside and the outside of the fluid chamber. Fluid may be supplied to the fluid chamber by connecting a suitable fluid supply source to the outer end of the tubular member. Upon withdrawal of the tubular member the valve passage is automatically closed due to the resiliency of the rubber about the valve passage. Illustrative of such a rubber valve reference is made to those disclosed in my U.S. Letters Patent Nos. 2,318,115 and 2,634,785.

Another type of valve currently employed in pneumatic tires is sometimes referred to as a metal valve. It comprises a valve plunger, usually of metal, yieldably held in closed position by a spring. The chuck at the outlet end of a fluid supply hose for inflating a tire equipped with such a metal valve includes plunger engaging means for moving the plunger to open the valve when the chuck is applied thereto. That plunger engaging means holds the valve open during the inflating operation. When the chuck is removed from the valve the spring reseats the valve plunger to close the valve.

A further object is to provide a service tool for an inflatable article with a rubber valve, having novel construction including a needle inflator-gauge member and cap means providing protection for the needle member when fitted thereon while providing lubrication for the needle member to aid in insertion of the needle member through the rubber valve.

A still further object is to provide a service tool of the general character noted above, which can be used with either a rubber valve or a metal valve.

Still another and more specific object is to provide a service tool of the foregoing general nature that is of universal character in that it can be used in either inflating or gauging an inflatable article having a metal or rubber valve.

Still another object is to provide a service tool of the foregoing general nature of novel construction and design including a gauge portion detachable from the remaining portion, whereby to enable and facilitate interchangeability of different kinds of gauges, such for example as a visual type gauge and an audible type gauge.

Another object is to provide, in one of its forms, a novel service tool for inflatable articles having rubber valves, adapted as an original instrument for the purpose, as contrasted with an adapter type instrument, and having normally closed valve means that is opened in response to insertion of the tool into the article to be inflated, and closes upon reaching a predetermined pressure.

Another object is to provide an instrument of the foregoing general character having a needle for penetration through a small and normally closed passage in a rubber valve, and a sleeve normally covering the needle and having means maintaining the needle lubricated, and having the further feature that the needle can be exposed by merely retracting the sleeve, either manually or in response to insertion of the needle into the valve.

A further object is to provide a novel audible type air-pressure gauge, that is adjustable relative to the air pressure at which it produces a signal.

Other objects and advantages of the invention will appear from the following detail description taken in conjunction with the accompanying drawings in which:

FIGURE 1 is an elevational view of the new service tool or instrument embodying the features of the invention;

FIG. 2 is a partial view of the right-hand portion of the device of FIG. 1 with the cap for enclosing the inflating needle removed;

FIG. 3 is an enlarged view of the device of FIG. 1 showing the head portion in section;

FIG. 4 is a fragmentary view, chiefly in section, of the instrument of the present invention adapting a conventional air chuck to a rubber valve in a tire;

FIG. 5 is a fragmentary view of a rubber valve element and inflating needle;

FIG. 6 is a detail view, partly in section, of the tool of FIGS. 1–5 applied to a metal valve;

FIG. 7 is an elevational view of the head portion of the instrument of FIG. 1 fitted with an alternate type of gauge;

FIG. 8 is an elevational view of a modified form of inflating and gauging instrument;

FIG. 9 is a large scale, longitudinal sectional view of the instrument of FIG. 8;

FIG. 10 is an end view from the left of FIG. 9;

FIG. 11 is a sectional view of the instrument of FIGS. 8, 9, and 10 in the position assumed in inflating a tire having a rubber valve;

FIG. 12 is a fragmentary cross-section showing details of the front end of the instrument of FIG. 9;

FIG. 13 is an elevational view of a modified form of tool;

FIG. 14 is a longitudinal sectional view, on an enlarged scale, of the tool illustrated in FIG. 13;

FIG. 15 is a detail view of a valve actuator utilized in the tool of FIGS. 13 and 14;

FIG. 16 is a view, partly in section, of a tool having a modified form of inflating-gauging needle;

FIG. 17 is a sectional view taken on line 17—17 of FIG. 16;

FIG. 18 is a sectional view of a further modified form of tool; and

FIGURE 19 illustrates a further modification.

Referring in detail to the drawings, attention is directed first to FIGS. 1 to 6 inclusive, showing a preferred form of the combination inflating and gauging tool of instrument. The instrument in the present form serves as an adaptor to adapt a conventional air line chuck for inflating a tire having a rubber valve. Referring to FIG. 1, it will be noted that the instrument indicated as a whole at 12 includes a head portion 14 and a shank portion 16, this representation being in original full scale from which it will be seen that the instrument is of small and compact form and may conveniently be carried in the pocket in the manner of a pen or pencil. A usual metal valve is known as the Schrader valve and substantially all automobile filling and service stations are equipped with facilities for servicing such valves and tires equipped therewith. With the instrument of the present invention an automobile owner may be assured of service for tires having rubber valves in such stations.

The instrument, as illustrated in FIG. 3, includes in the head portion 14 a body 18 which may be in the form of a casting, having a bore 20 extending therethrough. The bore 20 has portions of different dimensions for the purpose of accommodating a valve 22 which, in keeping with the intended character and purposes of the invention may be a conventional Schrader or similar valve for cooperation with an air chuck of conventional type. A shoulder 5 is formed in core 20 and engages the end of valve 22. The valve 22 need not be described in detail, but it is pointed out that it has a stem 24 which is operative upon depression thereof for opening the valve, and upon release of the force depressing the stem, a spring 26 closes the valve in the normal manner. The stem 24 terminates adjacent the rear end of the body 18 which is defined by a portion 28 which may be of reduced outer diameter relative to the remaining portion of the body, and of appropriate dimension to enter into a standard air chuck (FIG. 4), and thus is of a dimension similar to the outer end portion of a conventional Schrader valve.

At the front end of the body 18 is a reduced portion 30 receiving an enclosing cap 32 to be referred to again hereinbelow. Mounted in the reduced portion 30 is an inflating needle 34. The inflating needle is of novel character for insertion through rubber valves, and includes an outer tubular member 36 and an inner tubular member 38. The outer tubular member 36 is secured in the reduced portion 30 of the body 18 by suitable means such as by a press fit and welding. The opposite or front end of the tubular member 36 is preferably rounded as at 40 to facilitate penetration of the needle into the rubber valve, as pointed out in detail hereinbelow, without injury to the valve. Adjacent the front end of the needle the outer tubular member 36 is provided with lateral apertures 42 serving as the outlet communication between the passage 44 between the tubular members and the interior of the tire being inflated. It will be understood that the passage 44 serves as a continuation of the passage formed by the bore 20 and thus a passage for the flow of air from the air line is provided throughout the head portion of the device, namely through the body 18 and needle 34, when the valve 22 is open.

The inner tubular member 38 in the needle cooperates with an air gauge contained in the stem portion 16 of the instrument. The stem portion 16 is mounted in a socket 46 formed by a socket member 48 which may be an integral extension of the body 18 or a separate piece secured thereto. A bore 50 is formed in the body 18 and socket member 48 leading from the bore 20 to the socket, and the inner tubular member 38 is fitted at its rear or inner end in the bore 50. The front end of the inner-tubular member 38 is projected through an opening in the front end of the outer tubular member 36 as indicated at 52. When the needle is inserted in a valve (see FIG. 5, and description below) and the forward end is in position for the apertures 42 to communicate with the interior of the tire, the inner tubular member 38 also is in communication with the interior of the tire, thus establishing an air passage through the device from the air line to the tire, and from the tire to the gauge in the stem portion 16.

The gauge contained in the stem portion 16 includes a plunger 54 slidably arranged in a sleeve or tubular member 56 and normally projecting out the extended end thereof. The sleeve is secured in the socket 46 in any suitable manner such as by threading. When air pressure is imposed on the plunger it is projected further from the sleeve in accordance with the pressure applied thereto, the plunger having indicia such as 58 to indicate the pressure imposed, in the normal manner. The plunger 54 has a piston element 60 at its inner end in operative engagement with the inner surface of the sleeve and the plunger is biased to retracted or inner position by a compression spring 62 surrounding the plunger and engaging a fixed portion of the sleeve and the piston element 60. The gauge means is conventional and does not, in any particular form, enter into the essence of the invention. It may be stated that the gauge means is a self-contained portion of the instrument and upon removal of the sleeve 56 from the socket 46 the entire gauge means is removed from the head portion 14. Preferably the socket 46 is provided with a sealing gasket 64 at its inner end which is engaged by the inner end of the sleeve 56 for sealing that location against the escape of air in the gauging operation. The visual gauge thus described may be bodily removed from the socket and another gauge (e.g., the audible gauge of FIG. 7 and described below) may be substituted therefor.

The cap 32 serves not only as a protective element for the inflating needle 34 but it also serves to maintain the needle lubricated for facilitating entry thereof into a rubber valve, of the character represented in FIG. 4. The rubber valve has a passage therethrough which is normally closed by the inward pressure of the rubber surrounding the passage and hence resists penetration therethrough of any article. For that reason it is desired to maintain the needle lubricated and this function is performed by the cap 32. The cap performs a further function in adapting the tool to gauging a tire with a metal valve, as explained fully hereinbelow.

The cap 32 includes an outer casing 66 of suitable material such as steel and has a friction fit with the reduced portion 30 of the body 18. Preferably the cap is frictionally and releasably retained in position on the head portion by means of a split ring 68 which may be retained in a circular groove in the reduced portion 30 of the body 18 and biased outwardly for friction engagement by the inner surface of the cap casing. If desired, the cap may be provided with a similar groove for receiving the split ring. The cap may be readily removed from and replaced on the body portion in surrounding relation to the needle by mere movements of the cap in the appropriate direction. The opposite or forward end of the cap is open as indicated at 72 for receiving the end portion of a metal valve (FIG. 6) as explained below. The cap casing 66 is lined by a lubricating material 74 of any material suitable for retaining lubricant, but preferably sponge rubber which is effective for retaining substantial lubricant therein. The material 74 effectively engages the needle when the cap is in place, being confined between a rear shoulder 73 formed by a thickened wall portion 75 at the rear end of the sleeve, and another shoulder 77 formed by an interior rim or head 79 forming the rear limit of a socket 81 in which is fitted and confined an annular gasket 83 of suitable resilient and sealing material, receiving the extreme front end portion of the needle and closing or stoppering the apertures 42, when the cap is on the needle. When the cap is removed from the needle, some of the lubricant in the material 74 remains on the needle to facilitate insertion of the needle through the rubber valve. The lubricant is rubbed off in the valve, but the needle is again lubricated when the cap is replaced thereon.

The instrument, as explained above, is of small and compact size and to facilitate carrying it in the pocket the shank portion 16 is provided with a pocket clip 76 which may be of conventional type, having a band surrounding the shank portion. When the intrument is in the pocket and the clip engages the pocket flap, the head portion 14 of the instrument serves as a convenient element for grasping it and removing it from the pocket. The small and compact size of the instrument also facilitate carrying the instrument in the car, as in the glove compartment.

Attention is directed now particularly to FIG. 4 which represents the instrument as an adapter for a conventional air chuck to a tire having a rubber valve. This figure shows a rubber valve similar to that shown in my Patent No. 2,634,785, referred to above (and particularly in FIGS. 1 and 7 thereof). A portion of a wheel is represented at 78 and is provided with a rim element 80 on which rim a tire 82 is mounted, the tire may be of the tubeless type or have an inner tube 84. The rubber valve is indicated as a whole at 86 and includes a valve casing 88 which, as disclosed in said Patent No. 2,634,785, may be an integral portion of the inflatable article and provides a valve receiving passage therethrough. In the embodiment of the invention disclosed herein for illustrative purposes, the valve casing is generally tubular in shape and has a base flange 90 at its inner end for abutment against the wall of the air chamber. Within the valve casing 88 is a valve plug 92 having a longitudinal passage 94 adapted to communicate with, and terminating in, a transverse passage 96. The inner edge or surface of the transverse passage 96 is prong-shaped as shown at 97 (FIGS. 4 and 5), the prong assisting in the insertion of the needle 34 through the inner end of the valve, as described fully hereinbelow. It will be understood that these passages 94 and 96, in accordance with the above-mentioned Patent No. 2,634,785, are preferably in the form of slits and usually closed against the escape of air from within the tire, normally and in the absence of any instrument disposed therein. The valve casing 88 and the valve plug 92 are composed of rubber and normally the inward pressure of the rubber maintains the passages closed.

FIGURE 4 includes a conventional air chuck 98 applied to the instrument. This chuck includes an air passage 100 terminating in a socket 102 in which is disposed a valve 104 normally biased to closed position by a compression spring 106. The valve includes a stem 108 disposed, when the valve is closed, adjacent the outer end of the socket which carries an insert 110 threadedly secured in the head of the chuck. The insert 110 is in the form of an annulus and receives the rear end position 28 of the instrument, in the same manner as it receives the outer end portion of a conventional metal valve. Upon full insertion of the portion 28 into the air chuck, the stem 108 of the valve in the air chuck engages the stem 24 of the instrument, and both the valve 104 in the air chuck and the valve 22 in the instrument are opened, establishing communication from the air passage 100 in the air line to and through the instrument and into the interior of the tire when the instrument is in inflating position with respect to the tire. Such position is illustrated in FIG. 4 in which the needle 34, after removal of the cap 32, is disposed mainly in the passage 94 and projecting through one end of the transverse passage 96 of the valve. The needle is inserted into the longitudinal passage 94, the rubber surrounding the passage expanding the necessary extent for enabling the passage to receive the needle, and as it enters the transverse passage 96, it engages the prong 97 which is deflected by the needle to one or the other side of the needle, as illustrated in FIG. 4, whereupon the end portion 99 of the valve plug is similarly deflected, enabling the needle to project through the transverse passage 96 and into the interior of the tire. The side apertures 42 and the end aperture formed by the adjacent end of the inner tubular member 38 at 52, are thus in direction communication with the interior of the tire as stated. The needle 34 is so dimensioned that when the shoulder defined by the front reduced portion 30 of the body 18 engages the outer end of the valve plug, the front end of the needle is projected the desired distance beyond the transverse air passage 96. Air flowing through the passage in the instrument and the needle thereof flows out through the apertures 42 and into the interior of the tire.

Thus an operation is performed for inflating a tire, or both inflating and gauging the air pressure therein. Upon insertion of the needle into the valve, and application of the air chuck 98 to the instrument, as described, an inflating operation is performed. In the same operation, a gauging operation is performed. The air in the tire is enabled to flow through the aperture 52 in the front end of the needle and through the inner tubular member 38 into the air gauge. The air thus passing from the tire into the air gauge is imposed on the gauge piston element 60, and as explained above, the air pressure forces the plunger 54 out of the sleeve 56 an extent corresponding to the value of the air pressure. Hence, the gauging operation is performed simultaneously with the inflating operation. Because of the fact that the gauge is operated by the air passing from the tire through the inner tubular member 38, the gauge accurately represents the pressure of the air in the tire in static condition and is not effected by air pressure of a stream as that flowing into the tire. So far as I am aware, the instrument of the present invention is the first instrument effective for simultaneously and continuously inflating, and gauging the air pressure in, and inflatable article. As the pressure of the air in the tire increases, it is continuously gauged, in contrast to the use of instruments heretofore known.

It will be understood that the instrument may be used merely as a gauge, if so desired. Assume it is desired merely to gauge the air pressure in the tire, the needle is inserted into and through the valve plug as above described, and the air chuck 98 is not applied to the instrument. The valve 22 remains closed, and the air pressure in the tire is imposed on the piston element 60 precisely as described above.

The cap 32 when in place on the needle cooperates with the needle in gauging the pressure in a tire having a metal valve. Reference is made to FIG. 6 in this connection, where the instrument thus far described is shown applied to a metal valve 85 as in a gauging operation. The valve is of conventional kind and does not require detail description, but includes a valve element proper 87 having a stem 89 normally biased to outer closed position, but depressible to an open position, as is known. In the gauging operation the forward end of the needle-cap is applied to the valve as illustrated. The needle engages the valve stem 89 and depresses it and opens the valve, and the gasket 83 engages the outer end of the tubular member 91 of the valve and seals it. The air escapes from the tire through the valve and passes through the opening 52 at the forward end of the needle, and through the inner tubular member 38 of the needle, into the gauge, in the same manner as described above in connection with the gauging operation of FIG. 4. The forward end of the needle and the valve stem 89 are contoured and shaped to enable the air to pass therebetween and into the needle sufficiently freely to effect efficient gauging. The gasket 83 at all times completely seals the side apertures 42 of the needle and confines the passage of air to the aperture 52 and inner tubular member 38.

In the event the user desires a kind of gauge other than that described above, it may be replaced by another gauge of different character such as shown in FIG. 7. FIG. 7 shows the head 14 fitted with a gauge 112 which is an audible type gauge producing a whistle sound when the pressure applied thereto reaches a certain predetermined value. It will be recalled that the gauge described above, including the tubular member or sleeve 56, is secured in the socket 48 merely by threading it therein, and it may, of course, be removed from the socket simply by threading it out. Upon that being completed, the gauge 112 may be threaded in the socket as in the manner the sleeve 56 is threaded therein. The gauge 112 has a portion 114 which may be a tubular portion threaded for insertion in the socket 48. For description of the operation of gauge, see description of the gauging element as illustrated in FIGS. 9 and 11. But it may be noted that it includes an aperture 116 through which the air passes in making the whistle sound. Thus, the user may desire an audible type valve instead of the visual type valve as in the previous form, and if he does desire such, replacement may be made in a simple and expeditious manner.

It will be appreciated that while the instrument serves both inflating and gauging functions, the broad aspects of the invention encompass an instrument that may be either an inflator or gauge alone. For example, an inflator may consist of only the body 18 and a needle constituted by the outer tubular member 36. Similarly, a gauge may include only a needle having a passage leading to a socket such as 46 and gauge means in the socket. In either case, a cap such as 32, may serve to make the instrument serviceable for both metal and rubber valves.

Attention is next directed to FIGS. 8 to 12, inclusive, showing anoother form of instrument for use with a rubber valve. The instrument in the present instance is not necessarily and adapter for a conventional air chuck, but may be used as an original instrument in an air line for inflating automobile tires or other inflatable articles having rubber valves.

The instrument of the present embodiment is shown as a whole at 118 in FIG. 8, applied to an air line 120. The instrument has a rear portion 122, FIG. 9, exteriorly threaded for connection to a fitting 124 on the air line 120. The instrument 118 also includes a body 126, which may be a casting, having a main bore 128 including a fore portion 130 and a rear portion 132, divided by a transverse partition or wall 134 which may be in the form of a flange extending inwardly from the wall of the bore, and defining a central aperture 136.

The instrument includes a needle 138 similar to the needle 34 described above, having spaced inner and outer tubular members, these members being an outer member 140 and an inner member 142, preferably coaxial. The rear end of the needle is mounted in and supported by the body 126, being mounted directly in neck 146 and indirectly in the transverse partition 134. The specific means for mounting the needle includes a cup-shaped insert 144 fitted in the bore 132 and having a forwardly extending reduced diameter tubular portion or neck 146 fitted in the aperture 136. The front wall 148 of the cup 144 forms a shoulder between which and the transverse partition 134 is an annular gasket or packing element 149 compressed between the axially opposed members. Preferably the cup 144 has a snug fit with the wall of the bore 132. The cup 144 is retained in the bore 132 by means of the rear element 122, referred to above, which has a fore portion 150 screw threaded at 152 in the rear end of the body 126. A gasket 154 is interposed between the front end of the member 122 and the elements in front thereof, specifically being disposed in an annular recess 156 formed by offset portions in the cup 144 and body 126.

Air in the line 120 (FIG. 8) is controlled by a valve means 158, FIG. 9, in the rear end of the instrument, which includes a closure member 160 having a resilient gasket 162 on its front side, engageable with a valve seat 164 in the fitting 122 which surrounds an air passage 166 leading through the fitting and into the cup 144. The valve closure member 160 is on the rear end of a stem 168 to the front end of which is secured an actuating element 170, having a stem 172 extending through an aperture in each of the aligned three elements, namely wall 148 of the cup 144, gasket 149, and transverse wall 134. This aperture is preferably disposed adjacent the wall of the cup, the stem or extension 172 thus being eccentric. The stem 172 has a forwardly facing shoulder 174 engageable with the front wall 148 of the cup 144 for limiting its forward movement. The stem 172 rides in a groove 176 formed in the wall of the cup, and the rear end thereof when engaged by the stem 172 serves as a limit stop for rearward movement of the stem. The stem 172, being fitted in apertures in the cup 144 and transverse wall 134, serves to prevent angular displacement of the cup relative to the body. The valve means 158 is biased forwardly by a spring 178 surroundiing the stem 168 and compressed between the rear wall of a counterbore 180 and the rear surface of the actuating element 170. As will be observed from FIG. 9, the valve is normally held in closed position by the spring 178, and upon rearward movement of the valve, the closure member 160 is lifted from the seat 164. The opening movement is produced by rearward movement of the stem 172 pursuant to engagement therewith of the sleeve 182 as described in detail hereinbelow.

The sleeve 182 normally encloses and protects the forward end portion of the inflating needle 138 which, as will be observed, extends forwardly beyond the bore 130 in the body. The sleeve 182 reciprocates in the bore 130 from a forward needle enclosing position of FIG. 9 to a rear needle exposing position of FIG. 11. The sleeve 182 includes a cylindrical element 184 having a transverse wall 186 therein which may conveniently be located substantially midway of the ends of the sleeve, the wall having a reduced diameter bore 188 receiving the inflating needle 138 in a sliding fit. A compression spring 190 surrounds the needle between the transverse wall 186 and the transverse wall 134 in the body and serves to normally retain the sleeve in forward needle enclosing position of FIG. 8. The rear end of the sleeve 184 is provided with a guide means which may be in the form of a screw 192, threaded therein and projecting laterally therefrom. The screw extends into an insert 193 fitted in the sleeve and forming a means for engaging the valve stem 172 upon retraction of the sleeve. The insert may have a turned-over end portion 195 fitted in a slot 197 in the rear end of the sleeve. The head of the screw 192 rides in a groove 194 in the inner surface of the wall forming the bore 130 which extends the greater part of the length of the bore and serves to limit movement of the sleeve at least in forward direction. The wall defining the floor of the slot or groove 194 is provided with an aperture 196 at its forward end to enable insertion and removal of the screw 192 in the sleeve. The front end of the sleeve 184 is provided with a cap 198 suitably secured therein as by a threaded connection 200. The forward end of the cap has an aperture 202 of appropriate diameter to receive the needle 138 therein in a free sliding fit. The cap may be provided with a finger piece 204 for facilitating manually retracting the sleeve and exposing the needl 138 in an inflating operation.

As in the case of the instrument of the first embodiment, it is desired that the needle 138 be constantly lubricated for facilitating its insertion into and through the rubber valve, in which the passage as above described is normally closed and resists penetration therethrough of an instrument. To this end the sleeve 184 is provided with a lubricating material 206, which may be sponge rubber, and which is impregnated with a suitable lubricating medium such as oil. Upon sliding movement of the sleeve 184 relative to the needle 138, the lubricating material 206 maintains the needle fully lubricated throughout the necessary length. The oil remaining on the needle after retraction of the sleeve may be wiped off in the valve, but when the sleeve again moves to forward position this needle is relubricated for the next operation.

The needle 138 has a construction essentially similar to the needle 34 described above. The outer tubular member 140 has side apertures 208 which define communication between the passage 210 between the tubular members of the needle and the interior of the tire. The inner tubular member 142 communicates with the tire through an aperture 212 which constitutes the front open end of the tubular member. The outer tubular member 140 terminates rearwardly at the rear surface of the front end wall of the cup 144 and thus the passage 210 therein communicates with the passage leading from the rear end of the instrument to the needle. The inner tubular member 142 is projected through the rear end of the outer tubular member and is bent transversely at 214 where it communicates with a bore 216 formed in a side portion 218 of the body of the instrument. The side portion 218 of the body may be and preferably is integral with the main portion of the body 126. This bore 216 communicates by means of a short passage 220 with a bore 222 leading forwardly through the side portion 218. In this bore is a sleeve 224 in sliding relation therewith and having a rear wall 226 serving as a closure member for the passage 220. If desired means such as a gasket 228 may be used to facilitate airtight closing of the passage 220. The rear wall 226 of the member is provided with apertures 230 for establishing communication between the adjacent end of the bore 222 and the interior of the sleeve 224. A compression spring 232 surrounds a central stem portion 234 of the sleeve 224 and is compressed between the end wall 226 thereof and the adjacent end of a gauge element 236 having its inner end in or adjacent the near end of the sleeve 224. The member 236 is of tubular form and has apertures 238 in its wall 239 which surrounds the stem 234. The member 236 is a portion of a gauge element indicated in its entirety at 242 which has a large-diameter threaded portion 244 engaged in the complementary threaded portion 245 in the bore 222. The threads are of high pitch and serve to thread the gauge member further into or out of the bore 222 for effecting corresponding change in compression of the spring 232, which determines the pressure value of the air in the passage 220 at which the gauge opens and functions. The gauge element 242 has a plug 246 inserted in the bore 240, and a side aperture 248 leading from the end of the bore 240 into a counterbore 250 in the side portion 218 of the body. The outer end of the gauging element 242 is provided with a cap 252 which may be integral with the gauge element and which is provided with an aperture 254 for enabling escape of the air passing through the gauge element. The cap 252 has an annular flange 256 containing indicia markings 258 which with the cooperating mark 260 on the wall of the body portion 218 indicate the setting of the gauge member. An O ring 262 may be utilized for sealing the gauge element portion 236 in the bore 222, in the usual manner.

In the use of the instrument of the present embodiment, the user applies the instrument to the tire in the manner indicated in FIG. 11. This figure shows a rubber valve of the kind illustrated in FIG. 4 and the reference numerals in the latter figure are utilized in the present instance. In the application of the instrument to the tire, the needle 138 is, of course, to be exposed, and this may be initiated by applying the finger to the finger piece 204 at the front end of the sleeve 182 and pulling rearwardly on it. The point of the needle thus exposed is inserted in the passage 94 in the valve plug 92. If the user desires he may retract the sleeve manually the full extent, but instead he may let the sleeve retract pursuant to penetration of the needle into the valve plug. The needle is forced into the valve plug, as stated, to a position shown in FIG. 11 where the side apertures 208 and the end aperture 212 thereof are exposed in and communicate with the interior of the tire, as explained fully above in connection with the first embodiment.

Retraction of the sleeve to the position shown in FIG. 11 effects opening of the valve 158 in the instrument. This is brought about by the insert 193 engaging and moving the stem 172 of the valve. The element 170 moving with the stem 172 lifts the valve closure 160 from its valve seat. An air passage is thus established from the air line 120 into and through the instrument in the following manner: through bore 166, counterbore 180, the interior of the cup 144, the passage 210 between the tubular members of the needle, and the side apertures 208 communicating with the interior of the tire.

The gauge in the side portion 218 of the body is brought into play in response to the action of inflating the tire. The air in the tire is transmitted through the inner tubular member 142 in the needle, and through the turned over portion 214 thereof into the passage 216 and passage 220. When the air pressure is at a predetermined value, it lifts the tubular plunger 224 from its seat, i.e., the seat surrounding the passage 220. Air from the latter passage then enters into the bore 222 and through the apertures 230, whereby it enters into the interior of the tubular member 224, then through the apertures 238 into the interior of the bore 240 and then out through the side aperture 248. The air then enters the bore 250 and passes out through the aperture 254 to atmosphere. The air in passing through the gauge produces a whistle effect, in a well-known manner, the gauge itself being of well-known construction. The setting of the cap 252 predetermines the pressure of the spring 232, and that pressure of the air at which the tubular member 224 is lifted from its seat. Upon turning the cap 252 inwardly the threaded portion 244 engages the threads 245 of the wall of the bore and turns it in or out depending upon the direction of turning. The scale markings 258 and 260 serve as a visual indication of the setting of the gauge.

As in the case of the first embodiment, the device may be used as an inflating needle and the incorporation of the gauge therein in no way effects the inflating operation. Until the pressure in the tire reaches the predetermined value, according to the setting of the cap 252, the gauge remains closed, and the sole function of the instrument in that phase is to inflate the tire. When the pressure, however, does reach that predetermined value, it exerts back pressure through the inner tubular member 142 and hence through the gauge, as explained above, producing the audible signal. The pressure exerted on the gauge is the static pressure of the air in the tire, which is not affected by the inflowing air.

After completion of the inflating operation, the instrument is retracted from its inflating position. Upon retraction of the needle 138 from the valve, the sleeve 182 moves forward to its normal needle-enclosing position under the influence of the compression spring 190. Upon the initial forward movement of the sleeve, the retracting force on the valve actuating stem 172 is released and the compression spring 178 is then enabled to move the valve forwardly to closed position as shown in FIG. 9. The rearward movement of the sleeve 182 is limited by the engagement of the rear face of the finger piece 204 with the stop 203 in position as shown in FIG. 11 when inflating. When deflating 203 is turned to position shown in FIG. 9. In the latter position insert 193 is not permitted to move to the rear far enough to contact valve actuator 172 and open valve 158. If the tire is inflated above the pressure indicated on the whistle gauge sleeve 224 is lifted thereby opening a continuous passage from the inside of the tire out through the opening 254 thus permitting the air to escape from the tire until it reaches the pressure indicated on the gauge at which time sleeve 224 reseats closing passage 220. Thus stopping the whistle and thereby announcing the desired air pressure in the tire has been attained. It will be noted that the capacities of the inflating and gauging passages can be so proportioned that when sleeve 224 is lifted from its seat air will pass out of the tire at the same rate that it enters, thus giving an automatic stop to inflation and by the whistle a signal that inflation of the tire has been completed.

Attention is next directed to FIGS. 13, 14 and 15 which show another form of servicing tool for inflatable articles. The tool illustrated in these figures is of universal nature in that it may be utilized with equal facility and effectiveness with both a metal valve and a rubber valve. The present tool or device makes it possible for an automobile service station to be equipped with a single tool for both inflating and gauging tires, with metal valves and with rubber valves, to the end of minimizing the equipment required for such servicing operations. The owner of the service station may find it quite inconvenient if it is necessary to be equipped with a separate set of tools for each a metal valve and a rubber valve, since it would be necessary to replace one type of tool with another on an air line, or to have two separate air lines each equipped with a different kind of servicing tool.

The servicing tool of FIGS. 13 to 15 includes a central tube 264 defining an inner passage 266 and constituting a main portion of the body of the device. Another member 268 constitutes the remainder of the body and is affixed to the central tube 264. The member 268 includes a sleeve portion 270 telescoped over the end of the central tube 264 and sealed therewith as by soldering the joint therebetween. The body member 268 is roughly T-shape, or tricorn shape, having in addition to the sleeve portion 270 two other arms or extremities 272 and 274 respectively. The arm 272 is for use in connection with inflating a tire having a metal valve while the arm 274 is utilized in connection with three other operations, namely, gauging a tire having a metal valve, and both inflating and gauging a tire having a rubber valve. The details of construction of these portions and their operation will be explained in detail hereinbelow.

The member 268 has a shoulder 276 surrounding the sleeve portion 270 against which is butted the forward end of each of a pair of tubes or sleeves 278 and 280, the former being an inner tube and the latter an outer tube enclosing the former. Inscribed on the inner tube 278 is a scale 282 (FIG. 13) for indicating air pressure within the tire being serviced by the gauge means of which the tubes or sleeves are a part. The tubes 278 and 280 are transparent for presenting the scale 282, and a collar 316, described below, to view by the observer or user. The tubes may be of any suitable material for the purpose and preferably are of known kind of plastic.

The tubes 278 and 280 are supported at their rear end by a gauge regulator 284 which is in the form of a sleeve surrounding the central tube 264 and is slidable thereon. The gauge regulator 284 extends into or is disposed within the inner tube 278 and has threaded engagement therewith for effecting adjustment of the gauge regulator longitudinally of the device by threading it in the intended direction. The outer end of the gauge regulator 284 is provided with slots or ratchet means 286 for receiving the prongs of a suitable tool for effecting the adjusting movements thereof.

The rear end of the assembly including the tubes 278 and 280 and the gauge regulator 284 is received within a fitting indicated in its entirety at 288 which has a rear collar portion 290 engaging the central tube 264 and sealed thereto as by a tinned joint. The collar portion 290 has a forwardly facing shoulder 292 engaged by the elements within the fitting and particularly the inner tube 278. It may also be engaged by the gauge regulator 284 depending upon the extent the latter is threaded into or out of the tube. Rearwardly of the fitting 288 is an adapter 294 surrounding the rear end of the central tube 264 and having a flange 296 at its forward end engaging the fitting 288. Fitted over the end portion of the assembly thus far described is an outer sleeve 298 having an inturned flange 300 engaging the flange 296 and retaining the adapter 294 in place on the tube 264. The sleeve 298 is threaded on a central portion 302 of the fitting 288 and may engage a rearwardly facing shoulder 304 formed by an enlarged forward portion 306 of the fitting 288 which preferably surrounds the rear end of the outer tube 280. The latter portion 306 presents a forwardly facing internal shoulder 308 against which the tube 280 abuts, the latter serving as a limiting means for forward movement of the fitting 288. The collar portion 290 is formed with a rearwardly facing arcuate cut-out portion 310 in which is fitted an O-ring 312 for sealing the assembly at that location. The adapter 294 is externally threaded, as will be observed, for receiving a suitable air line 314 of known type, or an adapter thereon having threads engaging the threads on the adapter 294.

A movable gauging indicator and cooperating elements are contained within the inner tube or sleeve 278. This gauging means includes a collar or slide indicator 316 slidably mounted on the central tube 264 and having a luminous band 318 provided thereon. The collar 316 in its sliding movements on the tube 264 presents the luminous band at various points along the scale 282 to indicate the pressure of the air imposed on the collar, as explained below. The collar 316 is biased forwardly by a compression spring 320 surrounding the tube 264 and engaging the collar at its forward end and engaging the gauge regulator 284 at the rear end. Forwardly of the collar or slide indicator 316 is an O-ring 322 sealing the annular space between the tube 264 and the tube 278 in which the collar is disposed. The collar 316 is actuated and moved rearwardly by the air flowing into the space in which the collar is disposed, as explained below, and upon release of this air pressure the slide indicator is moved forwardly by the compression spring 320. The gauge regulator 284 serves as a means for adjusting the gauge and specifically adjusting the compression of the spring 320 for regulating the extent to which the collar 316 is moved rearwardly under any given air pressure, whereby to correlate the position of the collar with the indicia scale 282 to accurately indicate the given pressure. In the assembly of the device the gauge regulator 284 is adjusted to the desired position so that the collar or slide indicator 316 will accurately indicate the pressures involved. The adjustment is made by ratching 284 through slot 285 by means of screw driver after 290 is tinned to 264.

The central tube, or body member 264 is provided with a counter bore 324 in which is disposed a valve 326. This valve may be of any desired or conventional nature and may for convenience be similar to the valve 22 of FIG. 3 above. The valve is fitted into the counter bore 324 so as to prevent the passage of air therepast, and to control the passage of air therethrough, and has a stem similar to the stem 24 of the valve 22 engageable by a finger 328 which is a portion of the valve actuator 330 of FIG. 15. This valve actuator is roughly fork shape, including an outer yoke 332 having a pair of outer legs 334 interconnected by a cross piece 336 from which the finger 328 extends forwardly in the direction of and between the outer legs 334. The outer legs may be somewhat resilient for performing a releasable gripping action on the device as explained below. For this purpose also, the forward ends of the outer legs 334 are provided with detents 338. The legs 334 are also provided with projections 340 for facilitating grasping the actuator and moving it between its limit positions.

The valve actuator 330 is fitted to the device of FIGS. 13 and 14 by fitting the outer legs 334 in straddling relation over the forward end of the device as shown in FIG. 13 and with the central finger 328 inserted through an opening 342 in the body member 268. A gasket 344, annular in shape, is fitted in the opening 342 and receives the finger 328, sealing the interior of the body member 268 from the exterior. The finger 328 extends into a bore 346 formed in the body member 268 and aligned with the passage 266 in the tube 264. The finger 328 is operative for actuating the control stem of the valve 326, i.e., upon inward movement of the finger 328 the stem is depressed and the valve is opened, and upon movement of the finger 328 in the opposite direction the valve closes. The detents 338 are adapted to engage a shoulder 348 formed on the outer sleeve 280 for releasably retaining the valve actuator 330 in inward position, i.e., when the valve actuator is so moved to inward position for opening the valve by the finger 328 the detents 338 engage the shoulder 348 and hold the valve actuator in such position and thereby retain the valve in open position. When it is desired to close the valve the operator grasps the valve actuator 330 by means of the projections 340, and moves it to outer position, namely, he withdraws the finger 328 from the valve, and the valve then closes.

The arm 272 at the forward end of the device and extending from the body member 268 is essentially an integral extension of the latter. This arm constitutes a chuck for a metal valve and is provided with a passage 350 leading from the bore 346 and terminating in a recess 352 in which is disposed a conventional valve 354. The valve may be similar to the valve 104 in FIG. 4, in all material respects, and includes a stem 356 for engaging the valve stem of the metal valve in a tire. Further details of this construction are believed unnecessary and suffice it to say that when the arm 272, or chuck, is fitted to a metal valve in a tire the stem 356 engages the stem of the metal valve in the tire, and opens the latter. The device is used in inflating a tire having a metal valve, and when it is so used the valve 326 is first opened by the valve actuator 330. The valve 326 may be opened before the device is applied to a tire since the valve 354 serves to prevent uncontrolled escape of air from the device. The valve 326 becomes especially useful in connection with a certain function of the arm 274 in an inflating operation, as explained below.

The arm 274 of the device is similar in essential respects with the needle and cap arrangement described above in connection with FIGS. 1 to 6. The arm 274 includes a needle 358 and an outer cap 360. The needle includes an outer tube 362 fitted to the body member 268 by a suitable means which may include an enlarged end portion 364 fitted in an aperture 366 in the body member 268. The aperture 366 is the terminal portion of a passage 368 leading from the bore 346 in the body member through which air in an inflating operation flows through the valve 326 and to the needle. The needle at its forward end is provided with side apertures 378 for use in an inflating operation as described above in connection with the side apertures 42 in FIGS. 3 and 4.

The needle, and particularly the outer tube 362 thereof, is also provided with an end aperture 380 to which is connected a capillary tube 382 leading from that aperture rearwardly through the needle and into a bore or passage 384 which is formed in the sleeve portion 270 of the body member 268. The bore 384 opens into the space between the tube 264 and tube or sleeve 278 in which the collar or slide indicator 316 is disposed. In the gauging operation air from the tire being gauged enters into the aperture 380 and flows through the capillary tube and through the bore 384 into the space ahead of the collar, which forces the latter rearwardly, as described above, to a point indicating or representing the pressure under consideration. The position of the collar relative to the scale 282 thus indicates pressure of the air in the tire.

The cap 360 serves the purpose of lubricating the needle and blocking the side apertures 378, in the same manner as that described above. The cap 360 may include an internal flange 386 threadedly secured on the rear portion of the needle. Lubricating material 388 is interposed in the sleeve between this flange and a second internal flange 390 adjacent the forward or extended end of the sleeve. Forwardly of the flange 390 is a socket 392 in which is a gasket 394 which, when the cap is on the needle, blocks the side apertures 378 in the needle and prevents the escape of air therethrough. The forward end of the needle, when the cap is fitted fully on the needle, extends slightly forwardly of a gasket 394, for exposing the aperture 380 for the gauging operation of a metal valve. The forward end of the sleeve is provided with an opening 396 and the sleeve, for convenience and protection of the needle, extends slightly forwardly of the needle, this extension also serving to confine the gasket 394 in place. A pin 398 (FIG. 13) may be provided on the sleeve, if desired, for depressing the stem of the metal valve in a tire being inflated, if it is found the tire is over inflated, and for opening valve 356 (FIG. 14) to reduce the pressure in a tire equipped with a rubber valve.

The tool or instrument thus described, (FIGS. 13–15) is a universal tool in that it performs six distinct operations—all that are necessary in connection with all of the tires of the kind presently known that are likely to be encountered in a service station. The instrument is useful in inflating a tire having a rubber valve, gauging a tire having a rubber valve, inflating a tire having a metal valve, gauging a tire having a metal valve, deflating an overinflated metal valve and deflating an overinflated rubber valve.

The operation of inflating a tire having a metal valve was described above, i.e., the chuck 272 is applied to the valve. In gauging a tire having a metal valve, the operation is performed essentially as described above in connection with FIG. 6, namely, the arm 274, including the sleeve fitted on the needle, is applied to the metal valve in the tire in a manner precisely as indicated in FIG. 6. The forward end of the needle engages the stem on the metal valve (corresponding to stem 89 of FIG. 6) and the gasket 392 seals the valve, whereupon the air from the tire passes through the aperture 380 and the capillary tube 382 through the bore 384 into the space ahead of the collar or slide indicator 316. The tool or instrument needs no other conditioning or handling and functions effectively merely by placing the arm 274 on the valve as explained. In the above two operations, the valve 326 may remain open at all times.

In use of the instrument in connection with a tire having a rubber valve the sleeve 360 is removed from the needle and the needle is thereupon exposed for insertion through the rubber valve such as the valve 86 of FIG. 4. Upon passage of air through the tool the tire is inflated in the manner described above, the air passing through the side apertures 378 into the tire. In the same manipulation, with the needle extended through the rubber valve, the air in the tire passes through the end aperture 380 and capillary tube 382 in a gauging operation. Thus inflating and gauging in the use of the present instrument is performed simultaneously, as explained above.

The valve 326 becomes useful when the sleeve 360 is removed from the needle. While the sleeve is on the needle the side apertures 378 are blocked by the gasket 394, and when the sleeve is fitted in place on the needle the valve 326 may remain open. However, when the sleeve is removed from the needle, air would be permitted to escape through the needle if it were not for the provision of means to prevent it, such as the valve 326. After the needle is inserted through the rubber valve of the tire, as intended, the valve 326 is then opened and the inflating and gauging operation performed. Thereafter, the valve 326 is closed, and the needle removed from the valve.

It will be noted that the finger 328 is of smaller dimension than the bore 346, so as not to impede, at least to any appreciable extent, the air flowing through the instrument to the tire in the inflating operation involved.

Attention is next directed to FIGS. 16 and 17 showing a modified form of inflating and gauging needle. Such needle is indicated in its entirety at 400 and is constituted by a single tube shown clearly in cross section in FIG. 17. The tube may conveniently be formed by extrusion and hence constitutes an economical and inexpensive article. The tube includes side grooves 402 in its exterior which constitute gauging passages, and it has side apertures 404 to facilitate flow of air from the tube into the tire, the forward end being rounded preferably for facilitating insertion of the needle through the rubber valve.

The needle 400 is mounted in a fitting or housing 406 of suitable kind, the details of which need not be described, but having a passage therethrough communicating with the interior of the needle so that when the housing 406 is fitted to an air line the air passes therethrough and through the needle into the tire. Secured to the housing 406 is a tubular element 408 as by threaded engagement therewith, having an internal diameter greater than the external diameter of the needle for providing an annular space 410 therebetween. An aperture 412 leads from the space 410 to a tube 414 similar to the tubular extension 48 of FIG. 3 for receiving a gauge of suitable kind such as that illustrated in FIGS. 1 to 5.

The needle is applied to the tire as represented in FIG. 16, namely, the needle is inserted through the rubber valve 86, such as that represented in FIG. 4, to a position in which the forward end of the tubular element 408 engages the outer end of the rubber valve. The latter effectively seals the forward end of the element 408 so that the space 410 is sealed from the exterior. In the use of this needle the air passes through the needle in the inflating operation and into the tire. The side grooves 402 are quite deep and the rubber of the valve does not penetrate or extend into the grooves to any material extent. The grooves therefore provide open passages from the interior of the tire to the annular space 410 and the air from the tire in the gauging operation thus passes through the grooves and into the space 410, through the aperture 412, to the gauge provided in the tubular extension 414.

An instrument is illustrated in FIG. 18 that will serve as a simple and inexpensive and most readily adaptable instrument for use with an air line already equipped with a gauge. Rather than necessitating an air line so equipped with a gauge with a universal instrument such as described above, a simple instrument such as illustrated in FIG. 18 may be provided to enable utilization of the instrument already provided in the air line. The instrument of FIG. 18 includes features adapting it to either a metal valve or a rubber valve and is useful in the inflating operation while the gauge provided in the air line may be utilized in gauging the air pressure in the tire. The instrument includes a main tubular portion 416 adapted to be fitted to an air line 418 of the character noted above. Leading from the tubular portion 416 is an arm or extension 420 constituting a chuck in which is provided a valve 422 of conventional kind such as described above in connection with FIG. 4. In the use of the instrument the chuck 420 is applied to the metal valve in the usual manner.

Extending also from the tubular portion 416 is another arm 424 similar to the arm 274 of FIG. 14. In the present instance however, the cap 426 need not have an open forward end in view of the fact that the gauge is included in the air line and the arm 424 need not be utilized in gauging a tire equipped with a metal valve, i.e., with the cap on the needle. Hence the outer end of the cap 426 may well be closed and this fact is utilized in providing a small projection 428 which may be used for depressing the stem of a metal valve in a tire if it is found that the tire is over inflated and for opening valve 422 to reduce the pressure in a tire equipped with a rubber valve. Further details of construction of the device are believed unnecessary in view of the detailed description above, particularly that in connection with FIG. 14.

FIGURE 19 illustrates a modification of the invention which comprises a hollow body portion 431 which may be connected to a standard air line (not shown). A valve control button 432 turns on the air when depressed. If the air line is of the type which contains an indicator gauge and control valve, the button 432 may be permanently depressed by bail 433 which is pivoted to body portion 431.

An inflating needle 438 is connected to the body portion 431 and is covered by sleeve 439 which contains a lubricant holding material 441. The sleeve 439 has a valve depressor extension 444.

The lower end 443 of the needle and the lower end 442 of the sleeve may be used to inflate a metal valve. The gasket 446 provides an air tight seal.

The upper part 437 of the body portion 431 has an extension 434 in which is mounted a standard one way valve 436 which can be used for gauging or deflating when the needle 438 is inserted in rubber valves.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. An instrument of the character disclosed comprising a body and a needle leading therefrom, gauge means on the body, a passage leading from the front end of the needle to the gauge means, and a removable cap on the needle, a metal valve with a valve stem, said cap having an open front end, a sealing washer within the open end of the cap and forming a seal between the outer portion of the metal valve and the cap, and the end of the needle extending beyond the sealing washer to depress the valve stem of the valve.

2. An instrument of the character disclosed comprising a body portion, a needle extending forwardly from the body portion, the instrument having a passage extending through the needle and body and terminating in inflating apertures adjacent the front end of the needle, gauge means on the body portion, means forming a gauging passage leading from a gauging aperture adjacent the front end of the needle to the gauge means, and a removable cap on the needle, a metal valve with a valve stem, said cap having an open front end and defining with the needle an assembly adaptable to the metal valve wherein the needle engages the valve stem to open it and the cap sealingly engages the valve and defines a passage from the valve to the gauging aperture in the needle.

3. An instrument of the character disclosed comprising a body portion, a needle extending forwardly from the body portion, the instrument having a passage therethrough terminating in inflating apertures opening laterally through the needle adjacent the front end thereof, gauge means on the body portion, means forming a gauging passage leading from a gauging aperture opening longitudinally at the extreme front end of the needle to the gauge means, and a cap on the needle removable therefrom for exposing the needle for insertion through a rubber valve, lubricating means in the cap engaging the needle, and a resilient gasket in the cap engaging the needle and sealing the inflating aperture therein and forming a seat slightly inwardly from the front end of the needle, the needle and cap being adaptable to a metal valve in position in which the needle engages the stem of the valve and opens it and said resilient gasket engages the valve in an annular area surrounding the stem and defines a passage from the valve to the gauging aperture in the needle.

4. A servicing tool for a pneumatic tire, comprising a body portion having a longitudinal passage therethrough, a gauge on the body portion and connected to one end of said passage means, a needle with a longitudinal passage therethrough, in communication with the longitudinal passage in the body portion a cap covering said needle and forming a seal therewith, the cap having a multi-diametered passage therethrough in which the needle is located for protection and lubrication, the first section of the multi-diametered passage being adapted for removably attaching the cap to said body portion adjacent its junction with the needle, a lubricant means, the second section of the passage being of greater diameter than the first and said lubricant means held therein, the third section of said passage being of such diameter as to permit said needle to loosely slip therethrough, a sealing gasket, the fourth section of the passage of a diameter greater than the diameter of the third section and said sealing gasket mounted therein, and said fourth section having a central passage therethrough of smaller diameter than the diameter of the said needle and when the needle is in place in said gasket passage hermetically sealing the second or lubricating section from the outer section of said cap passage, a tire, a valve mounted in the tire, and having an outer section with a diameter so as to allow the end of the valve to loosely slip into it, a source of air supply, and said outer section being adapted as a chuck for the valve with means for sealing the end of said valve and for depressing its valve stem to form a continuous air passage from the source of air supply through the passages of the body, through the needle and on through the passage of the valve into the tire for its inflation.

5. A servicing tool for a pneumatic tire and adapted to service a rubber or metal valve, comprising a body portion having a longitudinal passage therethrough, an air supply, means for connecting the body portion to the air supply, a needle connected to the body portion and having two longitudinal passages, one being an inflation passage and connected to the longitudinal passage of the body portion and terminating adjacent the end of the needle, gauging means on the body portion, the other passage leading from the end of the needle to the gauging means, a cap for said needle and forming a seal therewith and having a multi-diametered passage therethrough in which the needle, is received, lubrication means mounted within the cap and engageable with the needle, the first section of the multi-diametered passage being adapted for removably attaching the cap to said body portion adjacent its junction with the needle, the second section of the passage being of greater diameter than the first, and said lubrication means mounted therein, the third section of said passage being of such diameter as to permit said needle to loosely slip therethrough, a gasket, the fourth section of said passage being of a diameter greater than the diameter of the third section and said gasket mounted therein and having a central passage therethrough of smaller diameter than the diameter of said needle and when the needle is in place in said gasket passage hermetically sealing the second or lubricating section from the outer section of said cap passage, said gasket being of such thickness and so located as to seal the inflation passage of the needle, the outer section having a diameter to allow a metal valve to loosely slip into it, said outer section being adapted as a chuck for said metal valve, and with means for sealing the end of the metal valve and for depressing its valve stem to form a continuous air passage from the interior of the tire to said gauging means.

6. An inflating and gauging instrument for both rubber and metal valves comprising a body portion including means, an airline fitting attached to the body portion, a needle extending from the body portion and having a gauging passage extending from the needle to the gauging means, a cap detachably receivable over said needle and lockable to the body portion, an inflating passage formed in the needle and extending from the needle to the airline fitting and a seal formed in the cap which engages and seals the inflating passage of the needle when the needle is attached to the body portion.

7. A gauging and inflating instrument in combination with a tire comprising, a tire with a rubber valve mounted therein, an inflating instrument formed with a body portion containing a gauging means, a needle extending from the body portion and receivable in the rubber valve, means forming a gauging passage extending from the needle to the gauging means, means forming an inflating passage formed in the needle, and an inflating means attached to the body portion and in communication with the inflating passage.

8. In apparatus according to claim 7, a needle cover detachably receivable over the needle and attachable to the body portion, and a gasket mounted within the cap and in sealing engagement with the inflating passage orifice of the needle when mounted on the needle.

9. In apparatus according to claim 8, said apparatus having lubricating means mounted within the cap.

References Cited in the file of this patent

UNITED STATES PATENTS

| | | |
|---|---|---|
| 1,196,142 | Schroeder | Aug. 29, 1916 |
| 1,503,068 | Sladek | July 29, 1924 |
| 1,594,386 | Stuart | Aug. 3, 1926 |
| 2,026,933 | De Laney | Jan. 7, 1936 |
| 2,233,096 | Goldsmith | Feb. 25, 1941 |
| 2,541,272 | Murphy | Feb. 13, 1951 |
| 2,646,042 | Hsi Hu | July 21, 1953 |
| 2,798,487 | Ferguson | July 9, 1957 |

FOREIGN PATENTS

| | | |
|---|---|---|
| 512,790 | Great Britain | Sept. 26, 1939 |
| 528,215 | Great Britain | Oct. 24, 1940 |